United States Patent
Chao et al.

(10) Patent No.: US 12,379,548 B2
(45) Date of Patent: Aug. 5, 2025

(54) CHIPLET COMMUNICATION USING AN OPTICAL COMMUNICATION SUBSTRATE

(71) Applicant: Lightmatter, Inc., Boston, MA (US)

(72) Inventors: Clifford Chao, Palo Alto, CA (US); Darius Bunandar, Boston, MA (US)

(73) Assignee: Lightmatter, Inc., Boston, MA (US)

( * ) Notice: Subject to any disclaimer, the term of this patent is extended or adjusted under 35 U.S.C. 154(b) by 37 days.

(21) Appl. No.: 18/542,974

(22) Filed: Dec. 18, 2023

(65) Prior Publication Data

US 2024/0201444 A1 Jun. 20, 2024

Related U.S. Application Data

(60) Provisional application No. 63/433,560, filed on Dec. 19, 2022.

(51) Int. Cl.
*G02B 6/35* (2006.01)

(52) U.S. Cl.
CPC ................ *G02B 6/3596* (2013.01)

(58) Field of Classification Search
CPC .............. G02B 6/35; G02B 6/3596
See application file for complete search history.

(56) References Cited

U.S. PATENT DOCUMENTS

| | | | |
|---|---|---|---|
| 11,036,002 B2 | 6/2021 | Harris et al. | |
| 11,036,660 B2 * | 6/2021 | Ooi | G06F 30/34 |
| 11,215,753 B2 * | 1/2022 | Islam | H01L 25/18 |
| 11,256,029 B2 | 2/2022 | Kannon et al. | |
| 2020/0200987 A1 * | 6/2020 | Kim | G02B 6/4212 |
| 2020/0284981 A1 | 9/2020 | Harris et al. | |
| 2020/0355880 A1 | 11/2020 | Wright et al. | |
| 2021/0215897 A1 | 7/2021 | Epitaux et al. | |
| 2021/0242124 A1 | 8/2021 | Kannan et al. | |
| 2021/0297163 A1 | 9/2021 | Rathinasamy et al. | |
| 2021/0385560 A1 | 12/2021 | Nagarajan et al. | |
| 2023/0060777 A1 * | 3/2023 | Yamaguchi | H04Q 11/0005 |
| 2023/0314742 A1 | 10/2023 | Dorta-Quinones et al. | |

OTHER PUBLICATIONS

Invitation to Pay Additional Fees dated Mar. 8, 2024, in connection with International Application No. PCT/US2023/084490.
International Search Report and Written Opinion dated Apr. 24, 2024, in connection with International Application No. PCT/US2023/084490.

* cited by examiner

*Primary Examiner* — Tina Wong
(74) *Attorney, Agent, or Firm* — Wolf, Greenfield & Sacks, P.C.

(57) ABSTRACT

Described herein are a computing systems comprising a photonic interposer having an optical network comprising a plurality of waveguides and a plurality of controllable optical switches; an electronic die having a surface bonded to the photonic interposer, an inner interface comprising a first plurality of ports electrically coupling the electronic die to the photonic interposer through the surface; and an outer interface comprising a second plurality of ports electrically coupling the electronic die to the photonic interposer through the surface, wherein the outer interface at least partially encloses the inner interface.

16 Claims, 11 Drawing Sheets

CHIPLET COMMUNICATION USING AN OPTICAL COMMUNICATION SUBSTRATE

CROSS-REFERENCE TO RELATED APPLICATION

This application claims the benefit under 35 U.S.C. § 119(e) of U.S. Provisional Patent Application Ser. No. 63/433,560, filed Dec. 19, 2022, entitled "CHIPLET COMMUNICATION USING AN OPTICAL COMMUNICATION SUBSTRATE," which is hereby incorporated herein by reference in its entirety.

BACKGROUND

Computer systems include random-access memories (RAM) for storing data and machine code. RAMs are typically volatile memories, such that the stored information is lost when power is removed. In modern implementations, memories take the form of integrated circuits. Each integrated circuit includes several memory cells. To enable access to stored data and machine code, memories are place in electrical communication with processors. Typically, these electrical communications are implemented as metal traces formed on the substrates on which the memories and the processors are disposed.

BRIEF SUMMARY

Some embodiments relate to a computing system comprising: a photonic interposer having an optical network comprising a plurality of waveguides and a plurality of controllable optical switches; an electronic die having a surface bonded to the photonic interposer; an inner interface comprising a first plurality of ports electrically coupling the electronic die to the photonic interposer through the surface; and an outer interface comprising a second plurality of ports electrically coupling the electronic die to the photonic interposer through the surface, wherein the outer interface at least partially encloses the inner interface.

In some embodiments, each port of the first and second pluralities of ports comprises: an electric connection connecting the surface of the electronic die to the interposer; and a SerDes coupled to the electric connection.

In some embodiments, the SerDes is formed on the electronic die.

In some embodiments, the photonic interposer further comprises a transimpedance amplifier (TIA) and a modulator driver coupled to the optical network, wherein the SerDes couples to either the TIA, the modulator driver, or both.

In some embodiments, at least one port of the outer interface is positioned within 1 mm of an outer perimeter of the electronic die.

In some embodiments, at least one port of the inner interface is positioned more than 1 mm away from the outer perimeter of the electronic die.

In some embodiments, the surface of the electronic die is between 25 $mm^2$ and 625 $mm^2$.

In some embodiments, the inner interface spans at least 20% of the surface of the electronic die bonded to the photonic interposer.

In some embodiments, the photonic interposer further comprises an off-chip optical coupler, wherein the photonic network couples the off-chip optical coupler to at least one port of the inner interface.

In some embodiments, each port of the first and second pluralities of ports comprises an Advanced Interface Bus (AIB) interface or a Universal Chiplet Interconnect Express (UCIe) interface.

Some embodiments relate to a computing system comprising: a photonic interposer having an optical network comprising a plurality of waveguides and a plurality of controllable optical switches, the photonic interposer having a surface configured to bond to an electronic die; and an interface comprising a 2-dimensional array of ports configured to electrically couple the electronic die to the photonic interposer when the electronic die is bonded to the surface of the photonic interposer, wherein the array is arranged with at least three columns and at least three rows of ports.

In some embodiments, each port of the 2-dimensional array comprises an electric connection configured to connect the electronic die to the surface of the interposer; and a SerDes coupled to the electric connection.

In some embodiments, the SerDes is formed on the electronic die.

In some embodiments, the photonic interposer further comprises a transimpedance amplifier (TIA) and a modulator driver coupled to the optical network, wherein the SerDes couples to either the TIA, the modulator driver, or both.

In some embodiments, at least one port of the inner interface is positioned more than 1 mm away from an outer perimeter of the electronic die when the electronic die is bonded to the surface of the photonic interposer.

In some embodiments, the photonic interposer further comprises an off-chip optical coupler, wherein the photonic network couples the off-chip optical coupler to at least one port of the 2-dimensional array.

In some embodiments, each port of the 2-dimensional array comprises an Advanced Interface Bus (AIB) interface or a Universal Chiplet Interconnect Express (UCIe) interface.

Some embodiments relate to a method for manufacturing a computing system, comprising obtaining a photonic interposer having an optical network comprising a plurality of waveguides and a plurality of controllable optical switches; bonding an electronic die to the photonic interposer through a surface of the electronic die, wherein the bonding comprises connecting the electronic die to the photonic interposer using: an inner interface comprising a first plurality of ports electrically coupling the electronic die to the photonic interposer through the surface; and an outer interface comprising a second plurality of ports electrically coupling the electronic die to the photonic interposer through the surface, wherein the outer interface at least partially encloses the inner interface.

In some embodiments, at least one port of the outer interface is positioned within 1 mm of an outer perimeter of the electronic die.

In some embodiments, at least one port of the inner interface is positioned more than 1 mm away from the outer perimeter of the electronic die.

In some embodiments, the surface of the electronic die is between 25 $mm^2$ and 625 $mm^2$.

Some embodiments relate to a computing system comprising a photonic interposer having an optical network comprising a plurality of waveguides and a plurality of controllable optical switches; a first electronic die having a first surface bonded to the photonic interposer, the first electronic die having: a first inner interface comprising a first plurality of ports electrically coupling the first electronic die to the photonic interposer; and a first outer interface comprising a second plurality of ports electrically coupling the first electronic die to the photonic interposer, wherein the first outer interface at least partially encloses the first inner interface; and a second electronic die having a surface bonded to the photonic interposer, the second electronic die having: a second inner interface comprising a third plurality of ports electrically coupling the second electronic die to the photonic interposer; and a second outer interface comprising a fourth plurality of ports electrically coupling the second electronic die to the photonic interposer, wherein the second outer interface at least partially encloses the second inner interface, wherein the optical network optically couples at least one port of the first inner interface to at least one port of the second inner interface.

In some embodiments, each port of the first and second pluralities of ports comprises: an electric connection connecting the first electronic die to the interposer; and a SerDes coupled to the electric connection.

In some embodiments, the SerDes is formed on the first electronic die.

In some embodiments, at least one port of the first outer interface is positioned within 1 mm of an outer perimeter of the first electronic die.

In some embodiments, at least one port of the first inner interface is positioned more than 1 mm away from the outer perimeter of the first electronic die.

In some embodiments, the inner interface spans at least 20% of the surface of the electronic die bonded to the photonic interposer.

BRIEF DESCRIPTION OF DRAWINGS

Various aspects and embodiments of the application will be described with reference to the following figures. It should be appreciated that the figures are not necessarily drawn to scale. Items appearing in multiple figures are indicated by the same reference number in the figures in which they appear.

DETAILED DESCRIPTION

The inventors have developed computer architectures that significantly improve the bandwidth of die-to-die communication between chiplets using chip-on-optical-silicon solutions (e.g., photonic interposers). The architectures developed by the inventors and described herein allow electronic dies to communicate with each other from any location within the area of the die—without requiring the data to pass from the edge of the die, as is the case in some conventional architectures (this is often referred to as the "beachfront limitation"). Thus, these architectures eliminate the die-to-die bandwidth limitations resulting from the fact that common input/output (I/O) interfaces are only placed near the edge of the die.

The power and performance improvements of silicon technology do not scale as fast as in the past. Currently, there are two approaches to produce high-performance application-specific integrated circuits (ASIC). One approach involves creating larger and larger silicon dies and systems-on-chip (SoC). Large dies lead to large bandwidth, given the on-chip nature of the communication channels. However, creating larger and larger silicon dies has a major drawback—large dies have low manufacturing yields, especially at advanced nodes. This means that among all the chips that are manufactured, only a small percentage of these can ultimately be deployed to customers. This increases manufacturing costs enormously.

Figure 1:
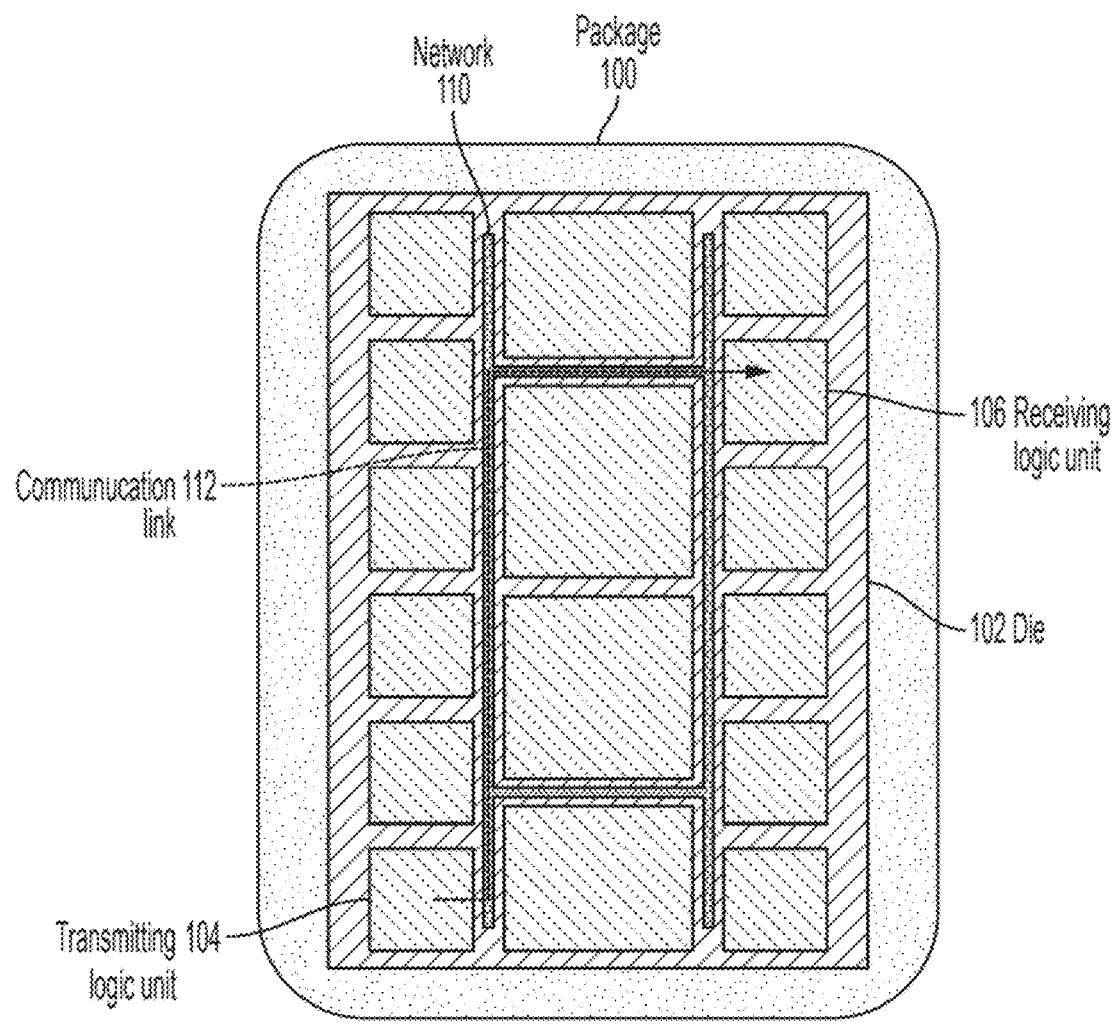
FIG. 1 is a diagram illustrating a package including a die.

FIG. 1 illustrates an example of a large monolithic electronic die 102. As shown, die 102 is part of a package 100, and includes multiple logic units (e.g., computational units, memory units, buffer units, etc.). A network 110 of on-chip electrical interconnects enables communication between the various units. In this example, a communication link 112 is established that enables data transmission from transmitting logic unit 104 to receiving logic unit 106. Given the on-chip nature of the interconnects, the bandwidth is relatively large, despite the fact that units 104 and 106 are not neighbors. Unfortunately, manufacturing such large dies (e.g., using typical ASML reticle size) with advanced nodes (e.g., 7 nm) produces low yields, making this approach very costly.

The second approach involves splitting the large dies into multiple smaller dies—often referred to as "chiplets"—which are interconnected using electronic interposers, substrates or printed circuit boards. This approach improves manufacturing yields, but is bandwidth-limited in that the die-to-die communication channels require significant area and are limited to short ranges, otherwise power consumption would be excessively large. Die-to-die communications between chiplets are implemented using a variety of 2.5D technologies.

These technologies are all short-range and thus can only communicate from the edge of the transmitting die to the edge of the receiving die. Thus, the die-to-die communication bandwidth is limited by the ports that can fit on the outer perimeter of the dies. Because these communication channels pass through large features (e.g., bumps and SerDes), the total communication bandwidth density is typically limited to about 400 Gbit/s per mm of die edge. This level of communication density is significantly lower than what can be achieved on-chip. In addition, this solution requires transferring data from the transmit logic unit to the I/O unit located near the edge of the die before the data can be transferred off-chip. This increases latency, area, and power consumption.

Figure 2A:
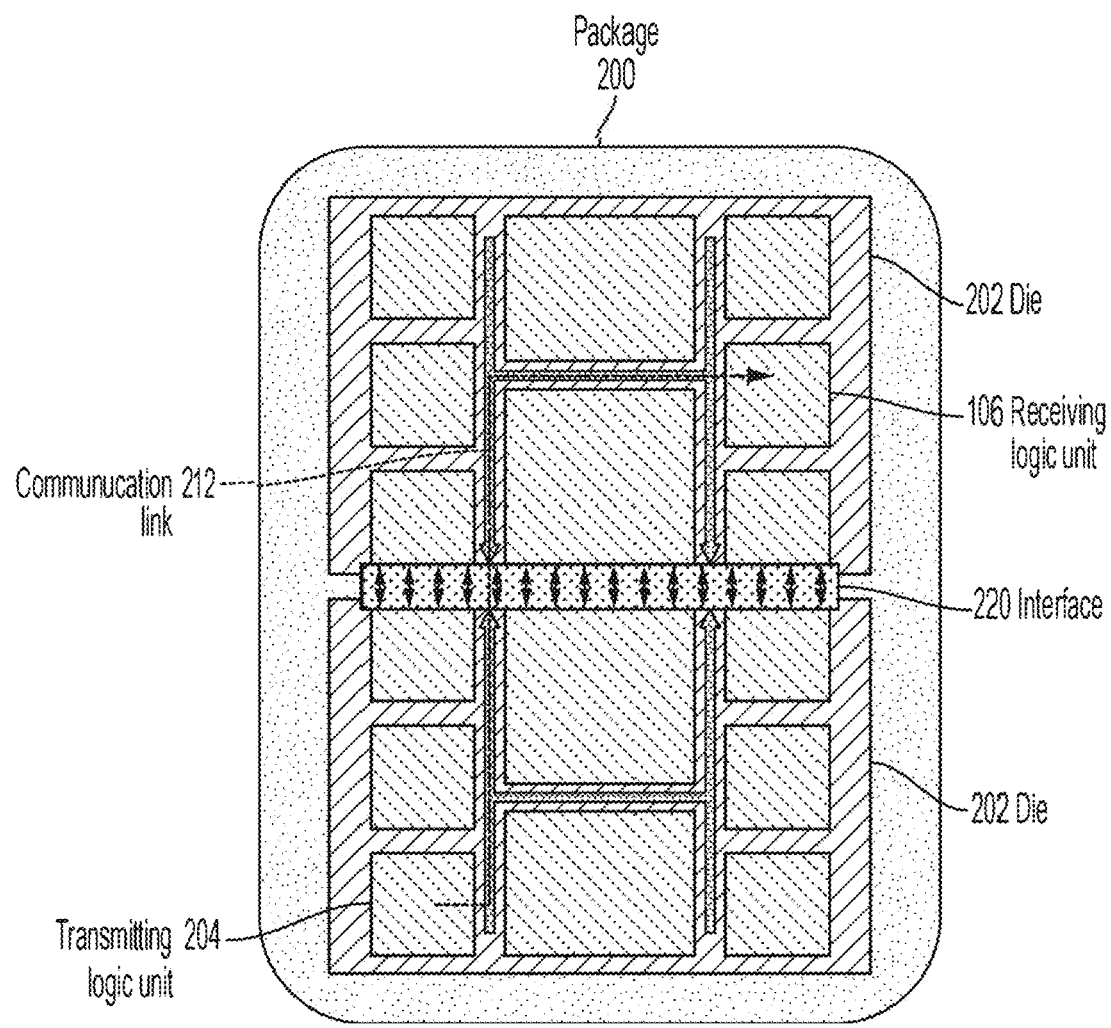
FIG. 2A is a diagram illustrating a package including multiple dies connected to each other via an interface.

FIG. 2A illustrates an example of a package 200 including smaller electronic dies 202. As in FIG. 1, each die 202 includes multiple logic units, but dies 202 are significantly smaller than die 102. An interface 220—including off-chip electrical interconnects—allows communication between dies 202. To limit the latency and power consumption associated with the off-chip electrical interconnects, the length of interface 220 should be limited to 2 cm or less. This means that data can be only transferred from adjacent edges of the dies, thus limiting the bandwidth density significantly. Latency and power consumption results from the presence of parasitic capacitance that is inherent to electrical interconnects. In this example, a communication link 212 is established that enables data transmission from transmitting logic unit 204 to receiving logic unit 206. Part of link 212 is on-chip, but another part of the link is off-chip (through interface 220).

Figure 2B:
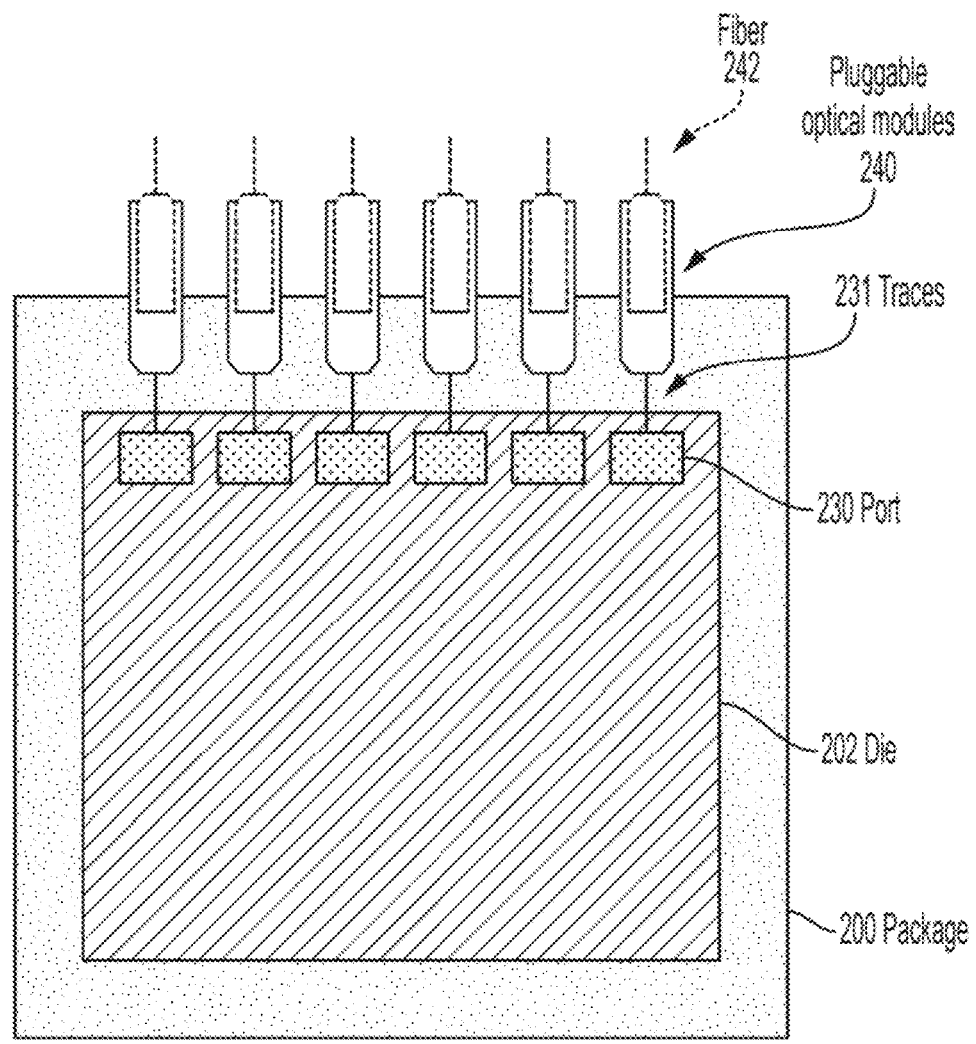
FIG. 2B is a diagram illustrating a package including multiple pluggable optical modules.

Optical solutions have been proposed, but these solutions do not address the beachfront limitations described above. FIG. 2B illustrates a package 200 having an electronic die 202, and pluggable optical modules 240. Pluggable optical modules 240 are connected to optical fibers 242, which are configured to transfer data between die 202 and devices outside the package. Pluggable optical modules 240 may be configured, for example, as a Small Form Factor Pluggable (SFP) transceiver, a Quadrature Small Form Factor Pluggable (QSFP) transceiver, or a C form-factor pluggable (CFP) transceiver. A set of electrical traces 231 connect die 202 to pluggable optical modules 240. The traces may be defined on an electronic interposer or other types of substrate on which die 202 is mounted.

At relatively high frequencies, the maximum length of traces 231 is dictated by signal integrity considerations, similar to the example of FIG. 2A. Beyond about 2 cm, the integrity of the signal degrades significantly, thus limiting the length to about 2 cm. As in the example of FIG. 2A, this means that ports 230 are required to be positioned near the edge of die 202 that is adjacent to the pluggable modules. If the ports were positioned at any other location within die 202, the length of traces 231 would exceed 2 cm, leading to errors in the data.

Figure 2C:
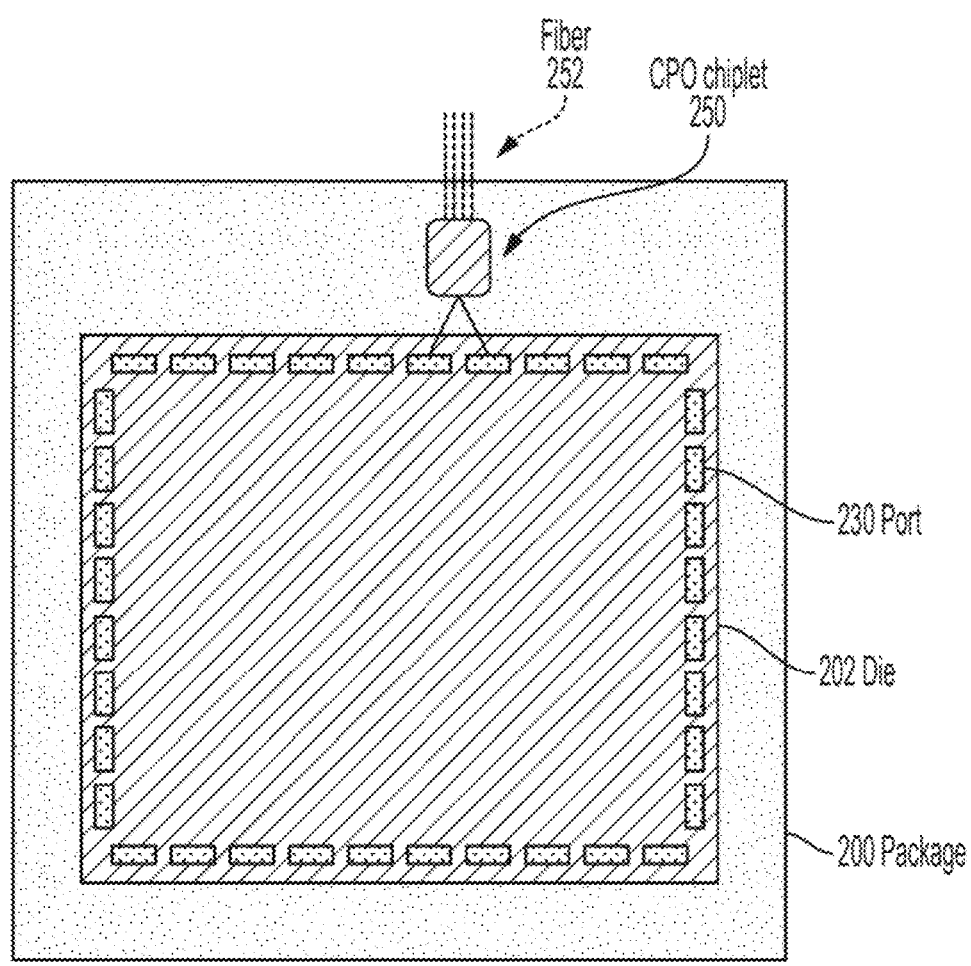
FIG. 2C is a diagram illustrating a package including a co-packaged optics (CPO) chiplet.

Solutions based on co-packaged optics (CPO) suffer from similar problems. An example is illustrated in FIG. 2C. Here, a CPO chiplet 250 is positioned near one of the edges of die 202. Other CPO chiplets (not illustrated) may be positioned near the other edges of die 202. CPO chiplet 250 is connected to fibers 252. Unlike the pluggable modules of FIG. 2B, CPO chiplet 250 is co-packaged with die 202. However, the result is largely the same as in FIG. 2B. Ports in die 202 are required to be positioned near the edge that is adjacent to the CPO chiplet, otherwise traces with lengths in excess of 2 cm would be needed.

In summary, each of the chiplet solutions described above (FIGS. 2A-2C) suffers from the beachfront limitation. The architectures described herein remove this limitation using photonic interposers. Photonic interposers enable inter-die communication in the optical domain. Unlike their electrical counterparts, optical channels do not suffer from parasitic capacitance, thereby curbing the inverse relationship existing between channel length and signal integrity. As described in detail further below, removing the beachfront limitation can result in a substantial bandwidth increase in that, in principle, any location within an electronic die can serve as a point of connection, not just the region near the edge. In other words, ports can be placed virtually anywhere within the die.

Figure 3:
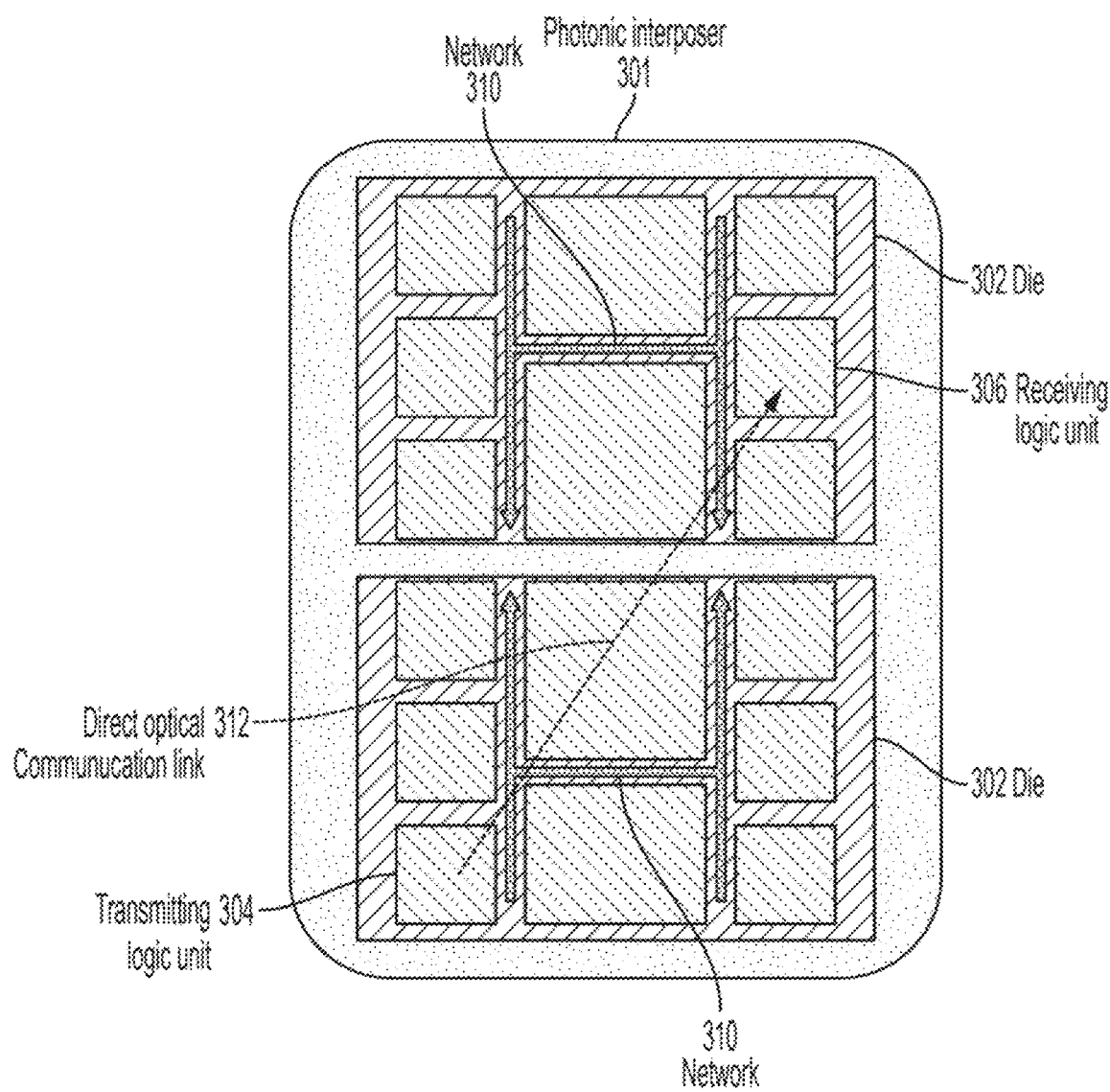
FIG. 3 is a diagram illustrating a package including a photonic interposer and multiple dies connected to each other, in accordance with some embodiments.

FIG. 3 illustrates a package having a photonic interposer 301, on which a pair of electronic dies 302 are mounted. A die 302 may be a processor, a memory, a graphic processing unit (GPU), an application-specific integrated circuit (ASIC), a field programmable gate array (FPGA), among other examples. Each die 302 includes an internal electrical network 310 coupling together the various units (e.g., computational units, memory units, buffer units, etc.) of the respective die.

The photonic interposer 301 includes an optical network (not shown) having optical waveguides and controllable optical switches. Communication between the dies occurs optically via the optical network of photonic interposer 301. Because optical channels do not suffer from degraded signal integrity at higher frequencies (unlike electrical channels), the length of these optical channels can be significantly longer than the 2 cm ceiling discussed in connection with electrical connections. This opens up the ability to directly connect any portion of a die to any portion of another die—without first having to pass through the edges of the dies. The inventors have appreciated that moving data within a single die is costly in terms of power and latency (the more data that have to be shuttled around may lead to further congestion). If a data processed by one die is immediately needed by another die, the scheme enables the data to be directly sent to the die needing the data without having to send the data to the edges, where the I/O units are located in conventional settings. Further, the data arriving at the other die can be placed in close proximity to the compute or switch or processing block needing that data.

In the example of FIG. 3, transmitting logic unit 304 can transmit data off-chip to receiving logic unit 306 using direct optical communication link 312. Link 312 is established using a portion of the optical network of interposer 301. Because the off-chip data transfer occurs within the photonic interposer, the channel does not necessarily have to pass through a port positioned adjacent to the edge of the die.

Figure 4A:
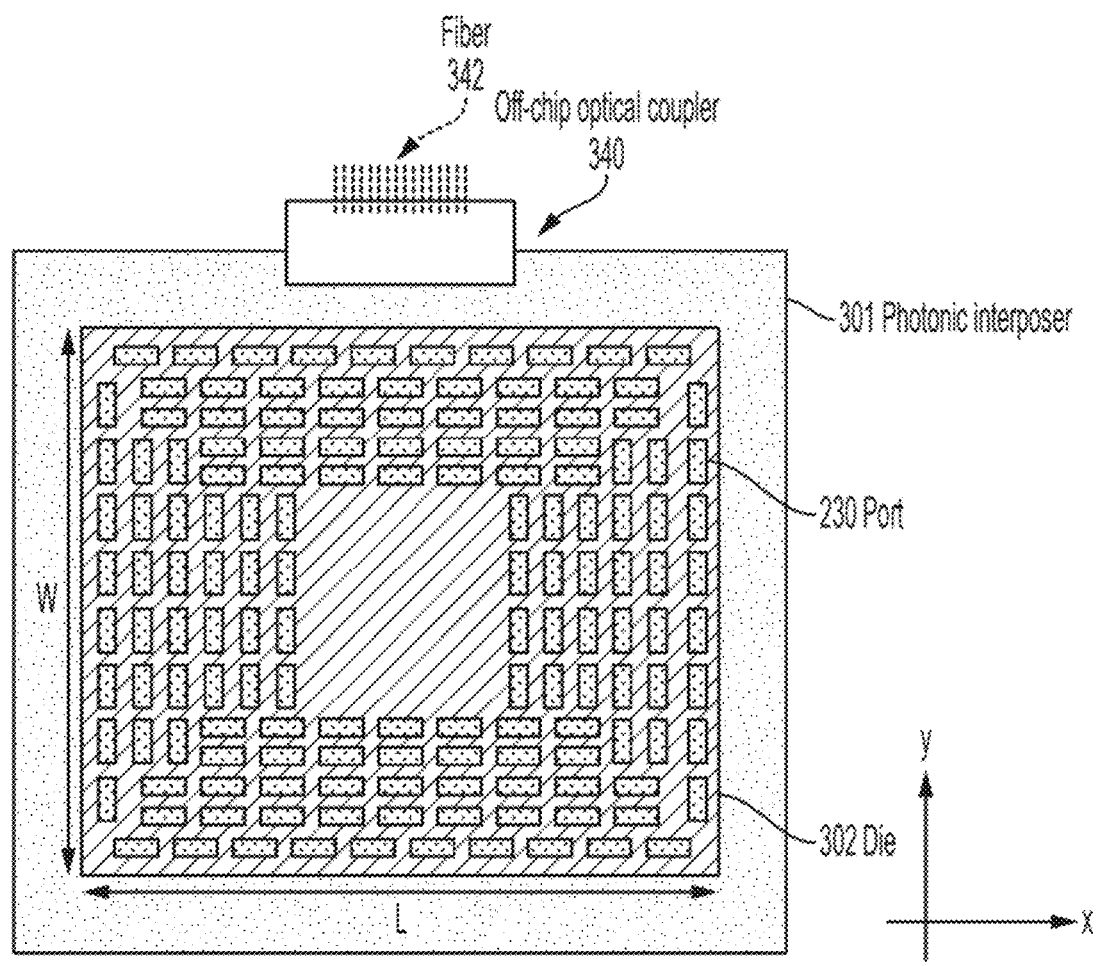
FIG. 4A is a diagram illustrating an electronic die mounted on a photonic interposer, in accordance with some embodiments.

FIG. 4A illustrates an example implementation of an electronic die 302 mounted on a photonic interposer 301. Die 302 has a width W and a length L in the xy-plane. Die 302 may be a relatively small chiplet. For example, length L may be between 5 mm and 60 mm, between 5 mm and 55 mm, between 5 mm and 50 mm, between 5 mm and 45 mm, between 5 mm and 40 mm, between 5 mm and 35 mm, between 5 mm and 30 mm, between 5 mm and 25 mm, between 5 mm and 20 mm, between 5 mm and 15 mm, between 5 mm and 10 mm, between 10 mm and 60 mm, between 10 mm and 55 mm, between 10 mm and 50 mm, between 10 mm and 45 mm, between 10 mm and 40 mm, between 10 mm and 35 mm, between 10 mm and 30 mm, between 10 mm and 25 mm, between 10 mm and 20 mm, between 10 mm and 15 mm, between 15 mm and 60 mm, between 15 mm and 55 mm, between 15 mm and 50 mm, between 15 mm and 45 mm, between 15 mm and 40 mm, between 15 mm and 35 mm, between 15 mm and 30 mm, between 15 mm and 25 mm, or between 15 mm and 20 mm, for example. Width W may be between 5 mm and 60 mm, between 5 mm and 55 mm, between 5 mm and 50 mm, between 5 mm and 45 mm, between 5 mm and 40 mm, between 5 mm and 35 mm, between 5 mm and 30 mm, between 5 mm and 25 mm, between 5 mm and 20 mm, between 5 mm and 15 mm, between 5 mm and 10 mm, between 10 mm and 60 mm, between 10 mm and 55 mm, between 10 mm and 50 mm, between 10 mm and 45 mm, between 10 mm and 40 mm, between 10 mm and 35 mm, between 10 mm and 30 mm, between 10 mm and 25 mm, between 10 mm and 20 mm, between 10 mm and 15 mm, between 15 mm and 60 mm, between 15 mm and 55 mm, between 15 mm and 50 mm, between 15 mm and 45 mm, between 15 mm and 40 mm, between 15 mm and 35 mm, between 15 mm and 30 mm, between 15 mm and 25 mm, or between 15 mm and 20 mm, for example. In some embodiments, the surface of die 302 (W×L) may be between 25 mm² and 3600 mm², between 100 mm² and 3600 mm², between 225 mm² and 3600 mm², between 400 mm² and 3600 mm², between 625 mm² and 3600 mm², between 900 mm² and 3600 mm², between 1225 mm² and 3600 mm², between 1600 mm² and 3600 mm², between 2025 mm² and 3600 mm², between 3025 mm² and 3600 mm², between 100 mm² and 1600 mm², between 225 mm² and 1600 mm², between 400 mm² and 1600 mm², between 625 mm² and 1600 mm², between 900 mm² and 1600 mm², between 1225 mm² and 1600 mm², between 50 mm² and 625 mm², between 100 mm² and 625 mm², between 225 mm² and 625 mm², or between 400 mm² and 625 mm², for example.

Ports 230 allow die 302 to communicate with the underlying photonic substrate 301 (along the z-axis). As shown in FIG. 4A, ports 230 are not limited to being positioned near the edges of the 302. Instead, ports 230 can be positioned virtually anywhere in the surface of die 302. Each port may include a conductive pad formed on the bottom surface of the die 302, a chip-to-chip connection (e.g., a conductive bump, pillar, via or ball) and another conductive pad formed on the top surface of the interposer 301. The chip-to-chip connection electrically connects the conductive pads together. In some embodiments, each port may further include an I/O unit formed on the side of the die and another I/O unit formed on the side of the interposer, and optionally a SerDes.

An off-chip optical coupler 340 permits coupling of optical signals between waveguides formed in the interposer and fibers 342. Coupler 340 may include, for example, multiple edge couplers and/or multiple grating couplers.

Figure 4B:
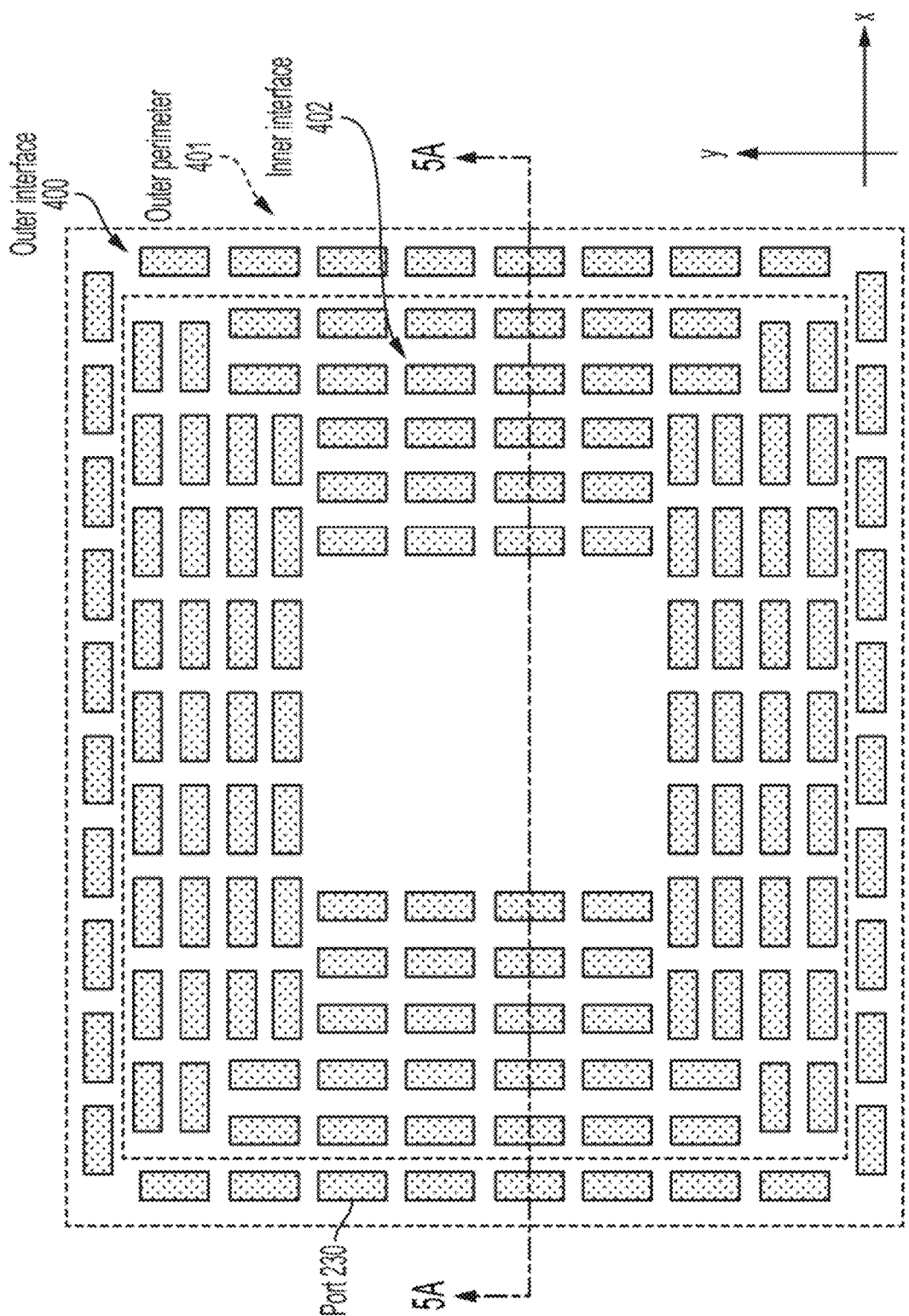
FIG. 4B is a diagram illustrating multiple ports connecting an electronic die to a photonic interposer, in accordance with some embodiments.

FIG. 4B illustrates the arrangement of the ports in additional detail. The ports 230 can be viewed as forming an outer interface 400 and an inner interface 402. Outer interface 400 is disposed between outer perimeter 401 of die 302 and inner interface 402. As such, outer interface 400 may be viewed as enclosing inner interface 402. In some embodiments, outer interface 400 may be viewed as enclosing inner interface 402 partially in that there may be no ports adjacent one of the edges (or adjacent more than one edge). It should be noted that the outer interface need not be immediately adjacent to the perimeter of the die.

Ports 230 may be organized in a 2-dimensional array, with rows and columns. In some embodiments, there may be at least three columns and three rows of ports. In some embodiments, the inner interface may span a surface of the die that is at least 20% of the area of the die surface, at least 30%, at least 40% or at least 50%.

In some embodiments, each port (or at least one port) of the outer interface 400 may be within 1 mm of the outer perimeter 401 (or within 0.1 mm, 0.25 mm, 0.5 mm, 0.75 mm, 1.5 mm, 2 mm or 3 mm, for example). In some embodiments, each port (or at least one port) of the inner interface 402 may be more than 1 mm away from the outer perimeter 401 (or more than 0.1 mm, 0.25 mm, 0.5 mm, 0.75 mm, 1.5 mm, 2 mm or 3 mm, for example).

Figure 5A:
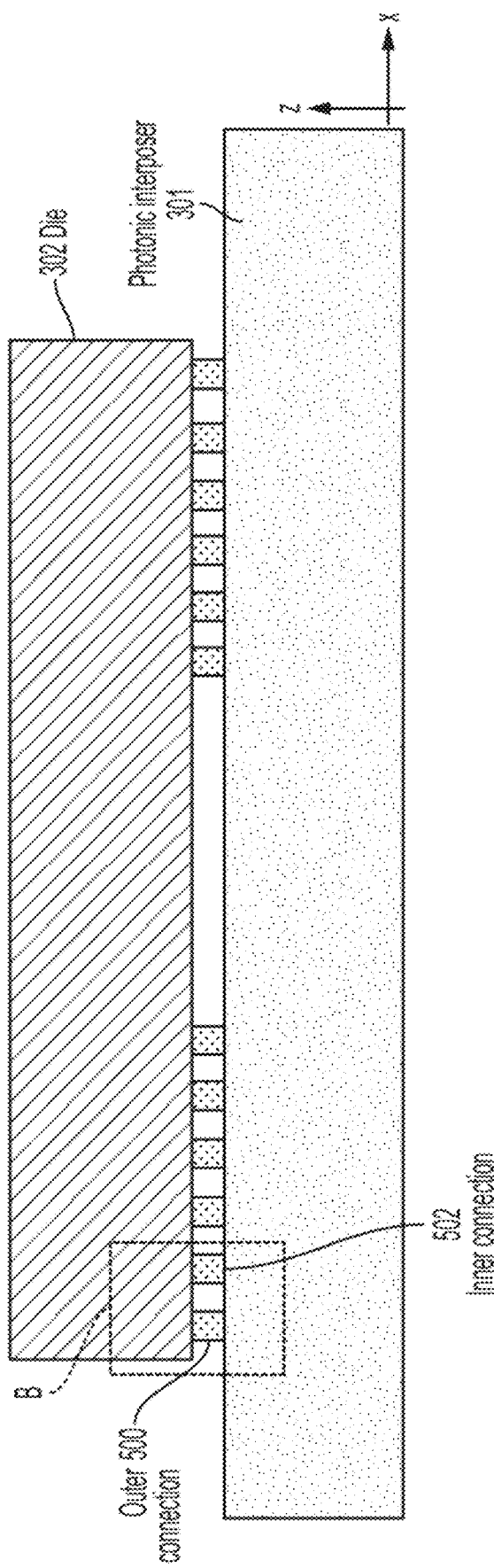
FIG. 5A is a cross sectional view taken along the AA line of FIG. 4B, in accordance with some embodiments.

FIG. 5A is a cross sectional view (in the xz-plane) taken along the AA line of FIG. 4B. As shown, die 302 is mounted on photonic interposer 301. Outer connections 500 are part of outer interface 400 and inner connections 502 are part of inner interface 402. The inner and outer connections may be implemented as conductive bumps, pillars, vias or balls, and electrically couple to die to the interposer.

Figure 5B:
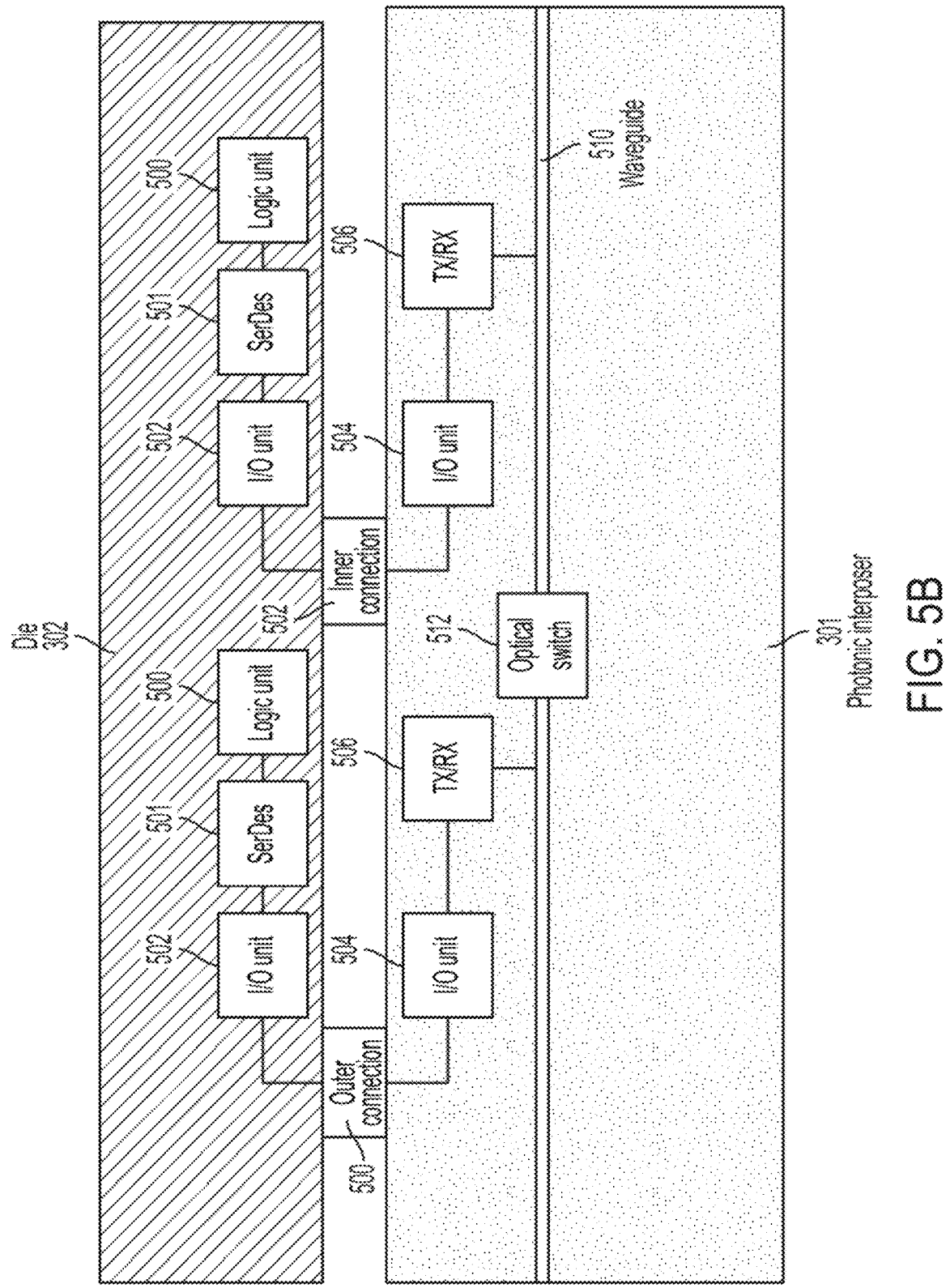
FIG. 5B illustrates a portion of the cross sectional view of FIG. 5A in additional detail, in accordance with some embodiments.
Figure 5C:
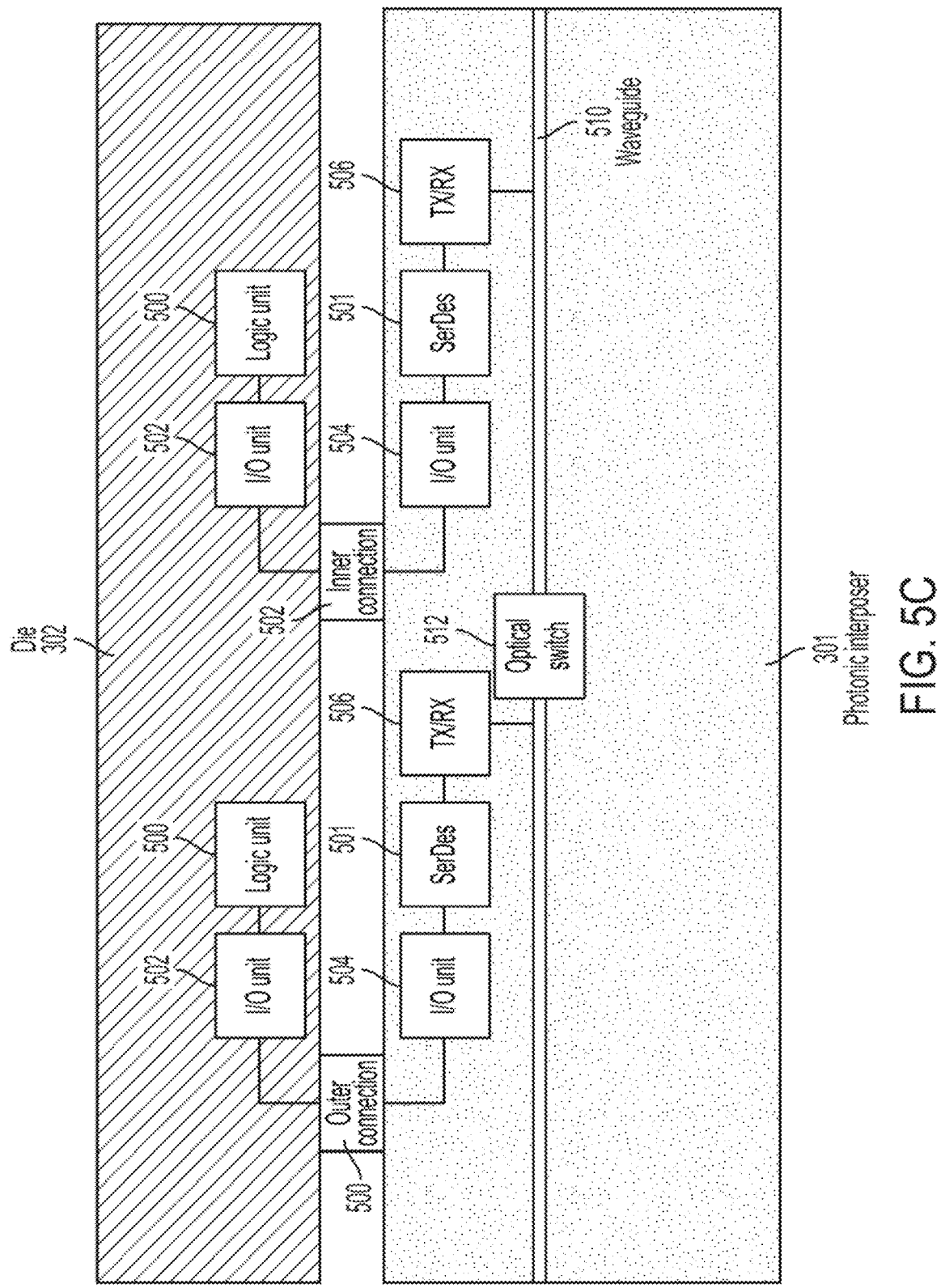
FIG. 5C illustrates a portion of the cross sectional view of FIG. 5A in additional detail, in accordance with some embodiments.

FIGS. 5B-5C are functional diagrams of a portion of the cross section of FIG. 5A (denoted "B" in FIG. 5A), in accordance with two alternative implementations. In the implementation of FIG. 5B, SerDes are formed on die 302. In the implementation of FIG. 5C, SerDes are formed on interposer 301. In either implementation, SerDes 501 are used to convert parallel data streams into a serial data stream for transmission and then convert received serial data back into parallel data at the receiving end. The serializer part of the SerDes takes parallel data, meaning multiple bits of data transmitted simultaneously, and converts it into a serial data stream. This is useful for transmission over channels with limited bandwidth or to simplify the interconnection between different components. On the receiving end, the deserializer takes the serial data stream and converts it back into parallel data. This is useful for extracting the original parallel data from the transmitted serial stream.

Each logic unit 500 may be a computational unit, a memory unit, a buffer unit, etc., and may be configured to transmit/receive data to/from other units of the die or units of another die. The I/O units 502 and 504 may include circuitry for transmitting and receiving information. For example, either one or both I/O units may include modulator drivers and transimpedance amplifiers (TIA). The I/O units may be configured to implement any suitable protocol, including Advanced Interface Bus (AIB), Universal Chiplet Interconnect Express (UCIe), Low-voltage-In-Package-INterCONnect (LIPINCON), Bunch of Wires (BoW), etc. TX/RX 506 includes an optical transceiver that converts data from the electrical domain to the optical domain and vice versa. For example, TX/RX 506 may include at least one modulator and at least one photodetector. The modulator may be driven by the modulator driver, and the TIA may amplify signals detected by the photodetector.

TX/RX units 506 couple to waveguide 510, which in turn couples to a controllable optical switch 512. Controllable optical switch 512 may be controlled to route optical signals to one of several outputs of the switch (although only one output is shown in FIGS. 5B-5C). Having multiple optical switches allows the network to route data from any logic unit of a die to any other logic unit in a dynamic fashion. Controllable optical switch 512 may be implemented in any suitable way, including for example using Zach Zehnder interferometers (MZI), ring resonators, disk resonators, and other types of controllable optical devices (e.g., with electrical, thermal, mechanical or optical control).

Figure 6:
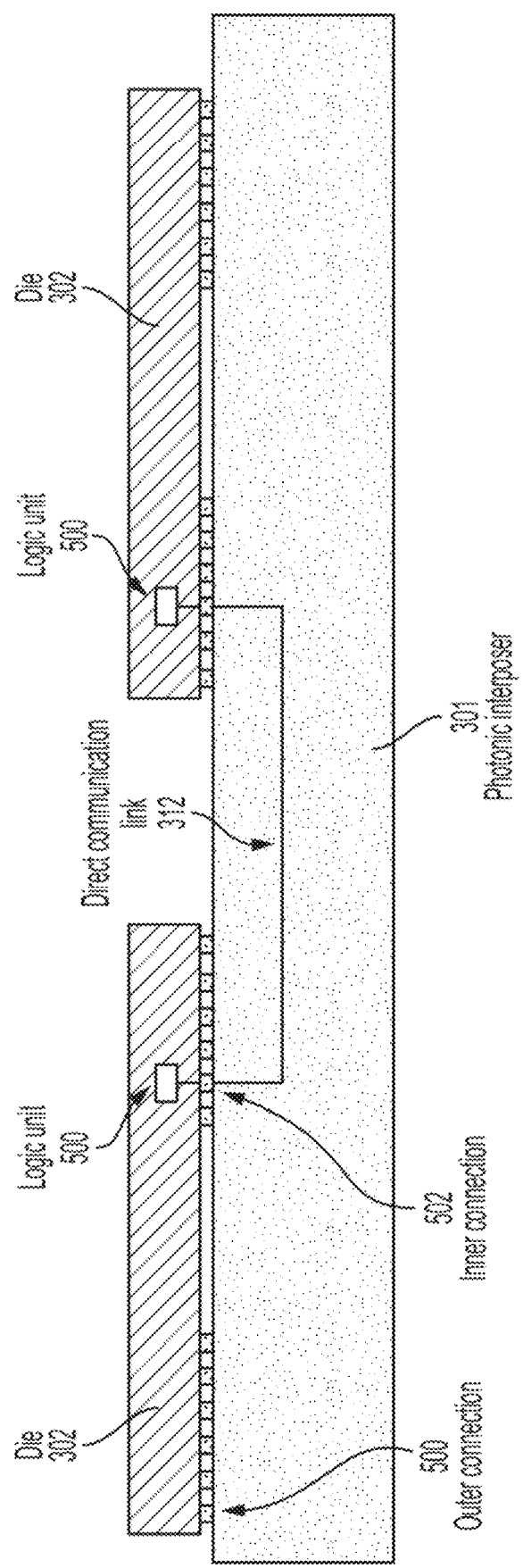
FIG. 6 is a cross sectional view illustrating multiple electronic dies mounted on a common photonic interposer, in accordance with some embodiments.

FIG. 6 is a cross sectional diagram illustrating a photonic interposer having multiple electronic dies 302 mounted thereon. Each die may have ports arranged in the manner described in connection with FIGS. 4A-4B and 5A-5C. As shown, the architecture illustrated of FIG. 6 removes the beachfront limitation in that any logic unit of one die may communicate with any logic unit of the other die directly—without first having to internally transfer the data to a port positioned at the edge of the die. This is because the logic units of FIG. 6 have direct access to ports that are positioned within the inner interface 402. Direct communication link 312 uses part of the waveguides and optical switches of interposer 301.

Having thus described several aspects and embodiments of the technology of this application, it is to be appreciated that various alterations, modifications, and improvements will readily occur to those of ordinary skill in the art. Such alterations, modifications, and improvements are intended to be within the spirit and scope of the technology described in the application. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, and/or methods described herein, if such features, systems, articles, materials, and/or methods are not mutually inconsistent, is included within the scope of the present disclosure.

Also, as described, some aspects may be embodied as one or more methods. The acts performed as part of the method may be ordered in any suitable way. Accordingly, embodiments may be constructed in which acts are performed in an order different than described, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

The terms "approximately" and "about" may be used to mean within +20% of a target value in some embodiments, within +10% of a target value in some embodiments, within +5% of a target value in some embodiments, and yet within +2% of a target value in some embodiments. The terms "approximately" and "about" may include the target value.

What is claimed is:

1. A method for manufacturing a computing system, comprising:
    obtaining a photonic interposer having an optical network comprising a plurality of optical switches including at least a first optical switch and a second optical switch and one or more waveguides optically coupling the first optical switch to the second optical switch;
    bonding a first electronic die to the photonic interposer through a first surface of the first electronic die, wherein bonding the first electronic die comprises connecting the first electronic die to the photonic interposer through a first interface comprising a first two-dimensional array of ports arranged in at least three columns and at least three rows, wherein the first interface comprises:
        a first inner interface comprising a first plurality of ports of the first two-dimensional array of ports electrically coupling the first electronic die to the photonic interposer through the first surface; and
        a first outer interface comprising a second plurality of ports of the first two-dimensional array of ports electrically coupling the first electronic die to the photonic interposer through the first surface, wherein the first outer interface at least partially encloses the first inner interface,
    wherein the first electronic die, when bonded to the photonic interposer, is associated with the first optical switch such that the first optical switch is configured to selectively couple the first electronic die to the one or more optical waveguides; and
    bonding a second electronic die to the photonic interposer through a second surface of the second electronic die, wherein bonding the second electronic die comprises connecting the second electronic die to the photonic interposer through a second interface comprising a second two-dimensional array of ports arranged in at least three columns and at least three rows, wherein the second interface comprises:
        a second inner interface comprising a third plurality of ports of the second two-dimensional array of ports electrically coupling the second electronic die to the photonic interposer through the second surface; and
        a second outer interface comprising a fourth plurality of ports of the second two-dimensional array of ports electrically coupling the second electronic die to the photonic interposer through the second surface, wherein the second outer interface at least partially encloses the second inner interface,
    wherein the second electronic die, when bonded to the photonic interposer, is associated with the second optical switch such that the second optical switch is configured to selectively couple the second electronic die to the one or more optical waveguides.

2. The method of claim 1, wherein at least one port of the first outer interface is positioned within 1 mm of an outer perimeter of the first electronic die.

3. The method of claim 2, wherein at least one port of the first inner interface is positioned more than 1 mm away from the outer perimeter of the first electronic die.

4. The method of claim 3, wherein the first surface of the first electronic die is between 25 mm$^2$ and 625 mm$^2$.

5. The method of claim 1, wherein:
    when the first electronic die is bonded to the photonic interposer, the first optical switch is disposed within a first area defined by the first electronic die, and
    when the second electronic die is bonded to the photonic interposer, the second optical switch is disposed within a second area defined by the second electronic die.

6. A computing system comprising:
    a photonic interposer having an optical network comprising a plurality of optical switches including at least a first optical switch and a second optical switch and one or more waveguides optically coupling the first optical switch to the second optical switch;
    a first electronic die having a first surface bonded to the photonic interposer, wherein the first optical switch is associated with the first electronic die such that the first optical switch is configured to selectively couple the first electronic die to the one or more optical waveguides, the first electronic die having a first interface comprising a first two-dimensional array of ports arranged in at least three columns and at least three rows, wherein the first interface comprises:
        a first inner interface comprising a first plurality of ports of the first two-dimensional array of ports electrically coupling the first electronic die to the photonic interposer; and
        a first outer interface comprising a second plurality of ports of the first two-dimensional array of ports electrically coupling the first electronic die to the photonic interposer, wherein the first outer interface at least partially encloses the first inner interface; and a second electronic die having a second surface bonded to the photonic interposer, wherein the second optical switch is associated with the second electronic die such that the second optical switch is configured to selectively couple the second electronic die to the one or more optical waveguides, the second electronic die having a second interface comprising a second two-dimensional array of ports arranged in at least three columns and at least three rows, wherein the second interface comprises:

a second inner interface comprising a third plurality of ports of the second two-dimensional array of ports electrically coupling the second electronic die to the photonic interposer; and a second outer interface comprising a fourth plurality of ports of the second two-dimensional array of ports electrically coupling the second electronic die to the photonic interposer, wherein the second outer interface at least partially encloses the second inner interface, wherein the optical network optically couples at least one port of the first inner interface to at least one port of the second inner interface.

7. The computing system of claim 6, wherein each port of the first and second pluralities of ports comprises:

an electric connection connecting the first electronic die to the interposer; and a SerDes coupled to the electric connection.

8. The computing system of claim 7, wherein the SerDes is formed on the first electronic die.

9. The computing system of claim 6, wherein at least one port of the first outer interface is positioned within 1 mm of an outer perimeter of the first electronic die.

10. The computing system of claim 9, wherein at least one port of the first inner interface is positioned more than 1 mm away from the outer perimeter of the first electronic die.

11. The computing system of claim 6, wherein the inner interface spans at least 20% of the first surface of the first electronic die bonded to the photonic interposer.

12. The computing system of claim 6, wherein the first optical switch is disposed within a first area defined by the first electronic die and wherein the second optical switch is disposed within a second area defined by the second electronic die.

13. The computing system of claim 7, wherein the photonic interposer further comprises a transimpedance amplifier (TIA) and a modulator driver coupled to the optical network, wherein the SerDes couples to either the TIA, the modulator driver, or both.

14. The computing system of claim 6, wherein the first surface of the first electronic die is between 25 mm$^2$ and 625 mm$^2$.

15. The computing system of claim 6, wherein the photonic interposer further comprises an off-chip optical coupler, wherein the photonic network couples the off-chip optical coupler to at least one port of the first inner interface.

16. The computing system of claim 6, wherein each port of the first and second pluralities of ports comprises an Advanced Interface Bus (AIB) interface or a Universal Chiplet Interconnect Express (UCIe) interface.

* * * * *